United States Patent
Kubota et al.

(10) Patent No.: US 9,582,740 B2
(45) Date of Patent: Feb. 28, 2017

(54) IMAGE PROCESSING APPARATUS, NON-TRANSITORY COMPUTER READABLE MEDIUM, AND IMAGE PROCESSING METHOD

(71) Applicant: FUJI XEROX CO., LTD., Minato-ku, Tokyo (JP)

(72) Inventors: Satoshi Kubota, Kanagawa (JP); Masanori Sekino, Kanagawa (JP); Shunichi Kimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 106 days.

(21) Appl. No.: 14/485,979

(22) Filed: Sep. 15, 2014

(65) Prior Publication Data
US 2015/0206006 A1    Jul. 23, 2015

(30) Foreign Application Priority Data
Jan. 22, 2014    (JP) ................. 2014-009690

(51) Int. Cl.
*G06K 9/00*    (2006.01)
*G06K 9/72*    (2006.01)

(52) U.S. Cl.
CPC ........... *G06K 9/72* (2013.01); *G06K 9/00449* (2013.01)

(58) Field of Classification Search
CPC ........ G06K 9/72; G06K 9/00442; G06K 9/18; G06K 9/00449

USPC ........ 382/137–139, 175, 177, 179, 181–182, 382/187

See application file for complete search history.

(56) References Cited

U.S. PATENT DOCUMENTS

| | | | | |
|---|---|---|---|---|
| 4,953,225 A | * | 8/1990 | Togawa | G06K 9/00402 382/179 |
| 5,555,325 A | * | 9/1996 | Burger | G06K 9/2054 382/309 |
| 6,035,061 A | * | 3/2000 | Katsuyama | G06K 9/00469 382/101 |
| 8,131,087 B2 | * | 3/2012 | Takebe | G06K 9/2054 382/101 |
| 2006/0177135 A1 | * | 8/2006 | Fujita | G06K 9/2054 382/187 |

FOREIGN PATENT DOCUMENTS

| | | |
|---|---|---|
| JP | 10-340314 A | 12/1998 |
| JP | 2002-163606 A | 6/2002 |
| JP | 2013-047887 A | 3/2013 |

* cited by examiner

*Primary Examiner* — Daniel Mariam
(74) *Attorney, Agent, or Firm* — Sughrue Mion, PLLC

(57) ABSTRACT

An image processing apparatus includes a receiving unit and a selecting unit. The receiving unit receives an image of a document. The selecting unit selects a character recognition result in a first frame of the document from plural character recognition candidates in the first frame on the basis of definition information defining a relationship between a character string in the first frame of the document and a character string in a second frame of the document different from the first frame.

9 Claims, 12 Drawing Sheets

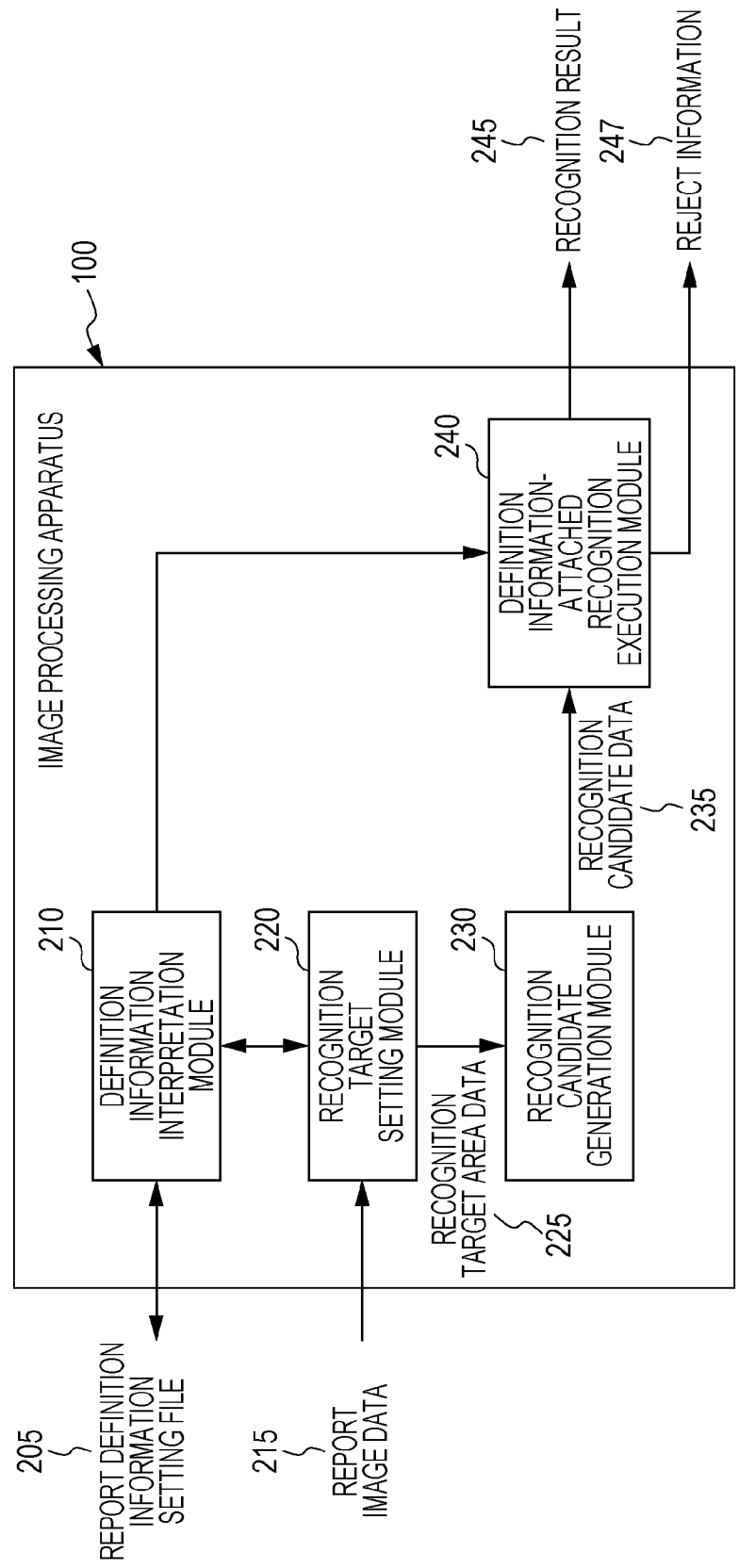

FIG. 3

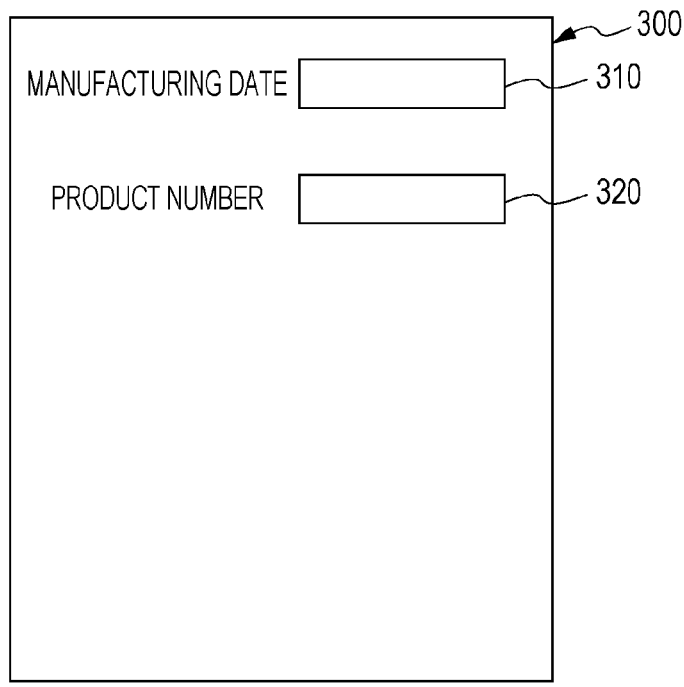

FIG. 4

| RULE | MEANING |
|---|---|
| [...] | A CHARACTER CORRESPONDING TO ONE OF ..., WHICH MAY BE SPECIFIED AS A RANGE SUCH AS [A-Z] |
| [^...] | A CHARACTER CORRESPONDING TO NONE OF ..., WHICH MAY BE SPECIFIED AS A RANGE |
| * | 0 OR MORE REPETITIONS OF THE IMMEDIATELY PRECEDING PATTERN |
| + | 1 OR MORE REPETITIONS OF THE IMMEDIATELY PRECEDING PATTERN |
| {m} | M NUMBER OF REPETITIONS OF THE IMMEDIATELY PRECEDING PATTERN |
| {m,} | MORE THAN m NUMBER OF REPETITIONS OF THE IMMEDIATELY PRECEDING PATTERN |
| {m,n} | MORE THAN m AND LESS THAN n NUMBER OF REPETITIONS OF THE IMMEDIATELY PRECEDING PATTERN |
| . | AN ARBITRARY CHARACTER |
| \| | LOGICAL SUM OF THE PRECEDING AND FOLLOWING REGULAR EXPRESSIONS |

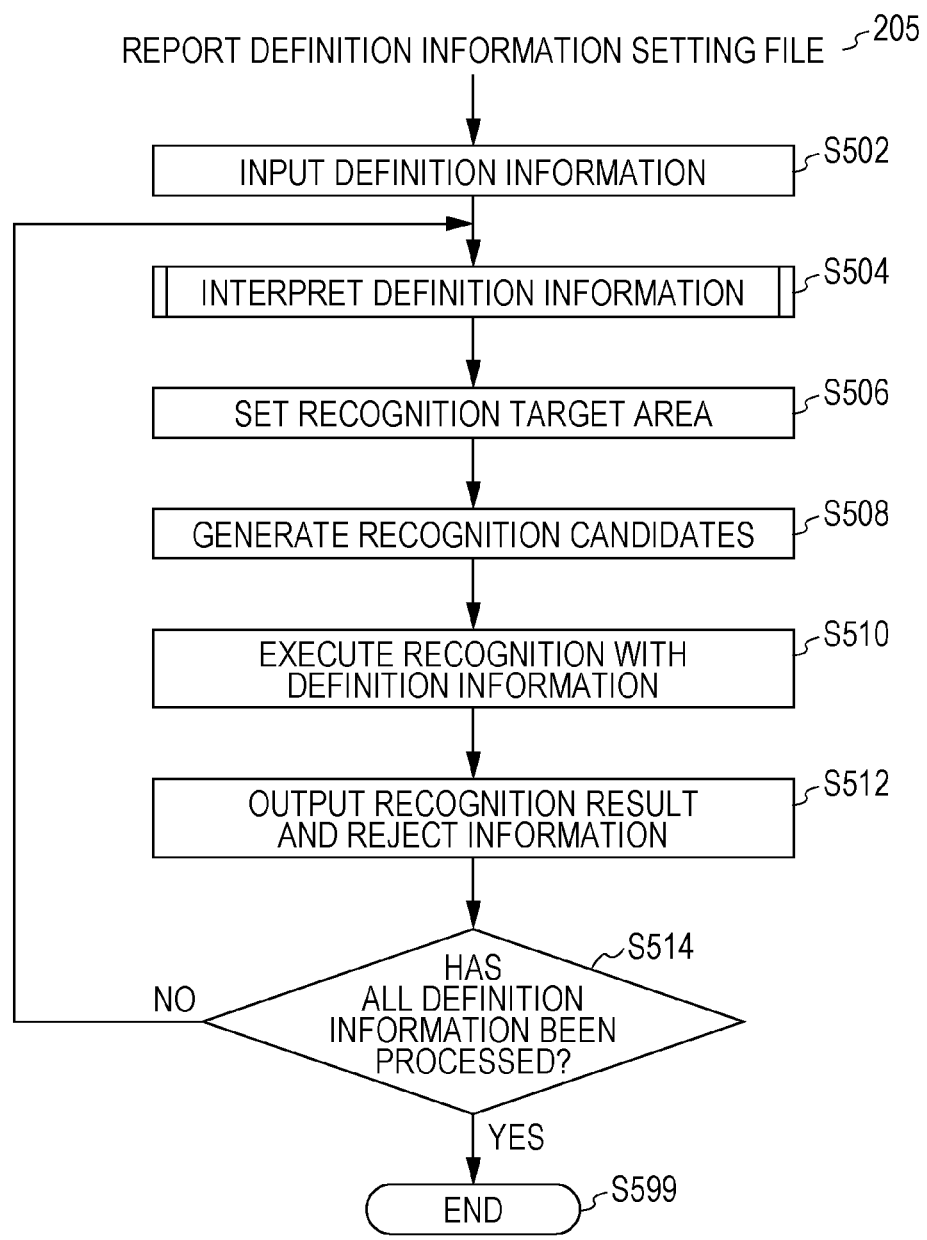

FIG. 6

| | COLUMN 1, | COLUMN 2, | COLUMN 3, | ......... | | | |
|---|---|---|---|---|---|---|---|
| ROW 1 | Field001, | RF, | regex_pattern.txt | | | | |
| ROW 2 | Field001, | WF, | word_list.txt | | | | |
| ROW 3 | Field001, | C, | 1003, | 1071, | 10, | 42, | 0x0001 |
| | Field001, | C, | 1002, | 1072, | 50, | 121, | 0x0001 |
| ......... | Field001, | C, | 1002, | 1071, | 128, | 200, | 0x0001 |
| | ... | ... | ... | ... | ... | ... | |

| | COLUMN 1 | COLUMN 2 |
|---|---|---|
| DEFINITION INFORMATION NAME | FRAME NAME | COMMAND |
| DEFINITION | NAME OF FRAME | FRAME TYPE SPECIFICATION COMMAND OR FORMAT DEFINITION COMMAND |
| EXAMPLE | Field001 | C |

FIG. 8

| SPECIFIC EXAMPLE OF COMMANDS | | |
|---|---|---|
| ABBREVIATION | FORMAL NAME | COMMAND TYPE |
| C | Char | FRAME TYPE SPECIFICATION COMMAND |
| HL | HorizontalLine | FRAME TYPE SPECIFICATION COMMAND |
| VL | VerticalLine | FRAME TYPE SPECIFICATION COMMAND |
| WL | WordList | FORMAT DEFINITION COMMAND |
| WF | WordFile | FORMAT DEFINITION COMMAND |
| RS | RegexString | FORMAT DEFINITION COMMAND |
| RF | RegexFile | FORMAT DEFINITION COMMAND |

FIG. 9

| DEFINITION INFORMATION NAME | COLUMN 3 | COLUMN 4 | COLUMN 5 | COLUMN 6 | COLUMN 7 |
|---|---|---|---|---|---|
| | POSITIONAL INFORMATION (TOP) | POSITIONAL INFORMATION (BOTTOM) | POSITIONAL INFORMATION (LEFT) | POSITIONAL INFORMATION (RIGHT) | CHARACTER TYPE LIMITATION PATTERN VALUE |
| DEFINITION | y COORDINATE VALUE OF UPPER-LEFT PIXEL OF FRAME | y COORDINATE VALUE OF LOWER-LEFT PIXEL OF FRAME | x COORDINATE VALUE OF UPPER-LEFT PIXEL OF FRAME | x COORDINATE VALUE OF UPPER-RIGHT PIXEL OF FRAME | CHARACTER TYPE LIMITATION PATTERN VALUE IN FRAME |
| EXAMPLE | 322 | 380 | 46 | 100 | 0x0001 |

FIG. 10
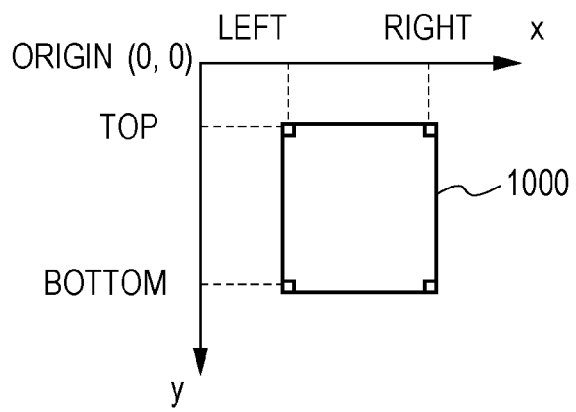
FIG. 11
| SETTABLE VALUE | RANGE OF CHARACTER TYPE LIMITATION |
|---|---|
| 0x0000 | ALL (UNLIMITED) |
| 0x0001 | NUMBERS |
| 0x0002 | UPPER-CASE ROMAN CHARACTERS |
| 0x0004 | LOWER-CASE ROMAN CHARACTERS |
| 0x0400 | CHINESE CHARACTERS |
| 0x1000 | COMMA |
| 0x2000 | HYPHEN AND MINUS SIGN |
| 0x4000 | PERIOD |
FIG. 12
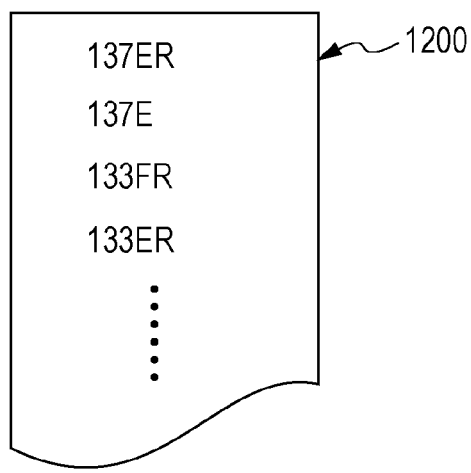

```
Field003,WF,product_num_list.txt
Field003,C,1002,1072,50,128,0x0001
Field003,C,1002,1072,128,205,0x0001
Field003,C,1002,1072,205,283,0x0001
Field003,C,1002,1072,283,362,0x0002
Field003,C,1002,1072,362,442,0x0002
Field003,C,1002,1072,442,522,0x0001
Field003,C,1002,1072,522,600,0x0001
Field003,C,1002,1072,600,678,0x0001
Field003,C,1002,1072,678,758,0x0001
Field003,C,1002,1072,758,835,0x0001
```
←1550

IMAGE PROCESSING APPARATUS, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2014-009690 filed Jan. 22, 2014.

BACKGROUND

Technical Field

The present invention relates to an image processing apparatus, a non-transitory computer readable medium, and an image processing method.

SUMMARY

According to an aspect of the invention, there is provided an image processing apparatus including a receiving unit and a selecting unit. The receiving unit receives an image of a document. The selecting unit selects a character recognition result in a first frame of the document from plural character recognition candidates in the first frame on the basis of definition information defining a relationship between a character string in the first frame of the document and a character string in a second frame of the document different from the first frame.

BRIEF DESCRIPTION OF THE DRAWINGS

An exemplary embodiment of the present invention will be described in detail based on the following figures, wherein:

FIG. 2 is a conceptual module configuration diagram of the configuration example of the present exemplary embodiment;

FIG. 3 is an explanatory diagram illustrating an example of a document as a recognition target;

FIG. 4 is an explanatory diagram illustrating an example of regular expressions;

FIG. 5 is a flowchart illustrating an example of processing according to the present exemplary embodiment;

FIG. 6 is an explanatory diagram illustrating an example of the data structure of a report definition information setting file;

FIG. 7 is an explanatory diagram illustrating an example of columns in the report definition information setting file;

FIG. 8 is an explanatory diagram illustrating an example of commands used in the present exemplary embodiment;

FIG. 9 is an explanatory diagram illustrating an example of columns in the report definition information setting file;

FIG. 10 is an explanatory diagram illustrating an example of positional information of a target frame in the present exemplary embodiment;

FIG. 11 is an explanatory diagram illustrating an example of limitation of character types used in the present exemplary embodiment;

FIG. 12 is an explanatory diagram illustrating an example of a list of recognition candidates used in the present exemplary embodiment;

DETAILED DESCRIPTION

An example of an exemplary embodiment for realizing the present invention will be described below on the basis of the drawings.

Figure 1:
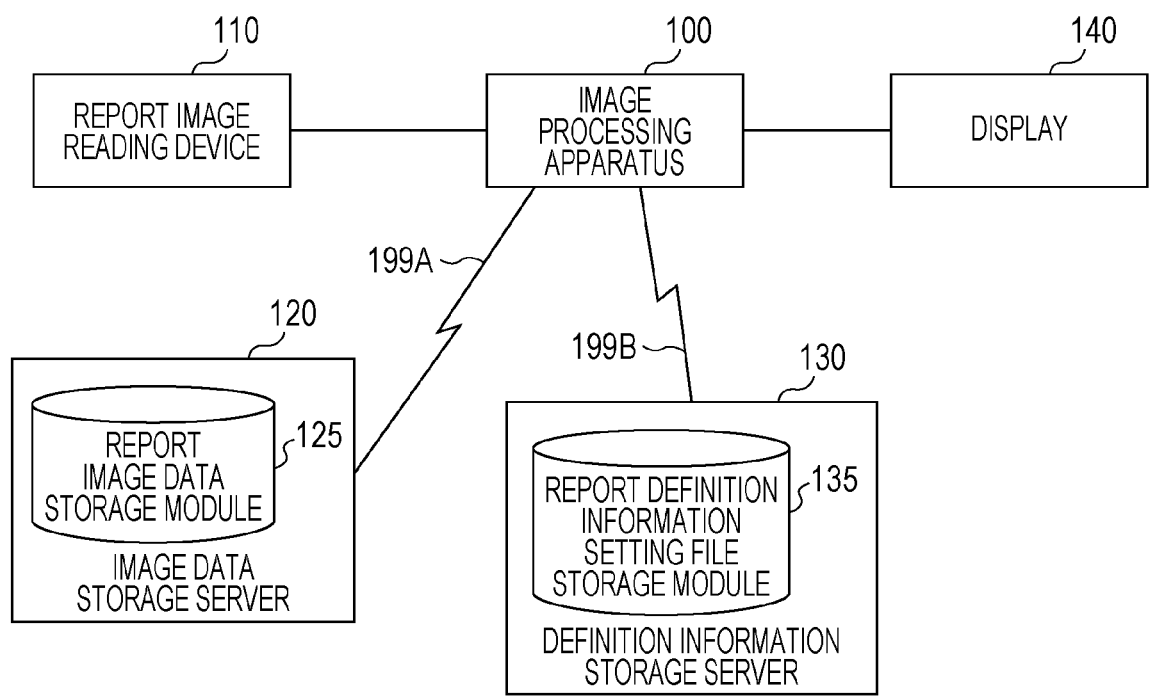
FIG. 1 is a conceptual module configuration diagram of a configuration example of the present exemplary embodiment.

FIG. 1 illustrates a conceptual module configuration diagram of a configuration example of the present exemplary embodiment.

In general, modules refer to logically separable components of software (a computer program), hardware, or the like. Modules in the present exemplary embodiment, therefore, refer not only to modules in a computer program but also to modules in a hardware configuration. Thus, description of the present exemplary embodiment will cover a computer program (a program for causing a computer to execute respective procedures of the modules, a program for causing a computer to function as respective units of the modules, or a program for causing a computer to realize respective functions of the modules), a system, and a method for causing a computer to function as the modules. For the convenience of description, wording such as "storing (something)" and "causing (an object) to store (something)" and equivalents thereof will be used. When an exemplary embodiment corresponds to a computer program, the wording means causing or controlling (an object) to store (something) in a storage device. Further, the modules may correspond one-to-one to the functions. In implementation, a single module may be configured by a single program, or plural modules may be configured by a single program. Conversely, a single module may be configured by plural programs. Further, plural modules may be executed by a single computer, or a single module may be executed by plural computers in a distributed or parallel environment. One module may include another module. Further, the term "connection" will hereinafter be used to refer to logical connection (such as transmission and reception of data, transfer of instructions, and reference of data) as well as physical connection. The term "predetermined" refers to the state in which something has been determined prior to a target process, and the term will be used to refer, of course, to the state in which something has been determined prior to the start of the processing according to the present exemplary embodiment, and also the state in which something is determined after the start of the processing according to the present exemplary embodiment but at a time before the target process in accordance with the state or status at or up to the time. If there are plural "predetermined values," the values may be different from one another, or two or more of the values (including, of course, all of the values) may be the same. Further, a description indicating that "if A is true, B is performed" will be used to denote that "whether or not A is true is determined, and B is performed if it is determined that A is true," except when the determination of whether or not A is true is unnecessary.

Further, a system or apparatus refers to a configuration in which plural computers, hardware components, apparatuses, and so forth are connected by a communication unit such as a network (including one-to-one communication connection) and also a configuration realized by a single computer, hardware component, apparatus, or the like. The terms "apparatus" and "system" will be used as synonyms. Needless to say, the term "system" will exclude mere social "structures" (social systems) arranged by humans.

Further, when modules perform respective processes, or when plural processes are performed in a module, target information is read from a storage device in each of the processes, and the result of the process is written in the storage device after the execution of the process. Therefore, description of reading from the storage device before the process and writing in the storage device after the process may be omitted. Herein, the storage device may be a hard disk, a random access memory (RAM), an external storage medium, a storage device via a communication line, or a register in a central processing unit (CPU), for example.

An image processing apparatus 100 according to the present exemplary embodiment recognizes the image of a document. As illustrated in the example of FIG. 1, the image processing apparatus 100 is connected to a report image reading device 110 and a display 140. The image processing apparatus 100 is also connected to an image data storage server 120 and a definition information storage server 130 via a communication line 199A and a communication line 199B, respectively. In character recognition, the image processing apparatus 100 is controlled to output a character string matching predetermined format information and a predetermined character string pattern.

The report image reading device 110 is connected to the image processing apparatus 100. The report image reading device 110 reads the image of the document, and transfers the image to the image processing apparatus 100 as report image data 215 (see FIG. 2). The report image reading device 110 corresponds to, for example, a scanner, a facsimile machine, or a multifunction machine having the functions of a scanner and a facsimile machine. The report image data 215 includes at least a predetermined frame in the configuration of the document. A report will be exemplified below. The frame is generally enclosed by straight solid or broken lines, for example, but is not necessarily needed to be enclosed by straight lines, and may be any area in which a character string (which includes at least one or more characters) as the target of character recognition is described. Further, the character as the recognition target may be printed or handwritten.

The image data storage server 120 is connected to the image processing apparatus 100 via the communication line 199A. The image data storage server 120 includes a report image data storage module 125, and transfers the report image data 215 stored in the report image data storage module 125 to the image processing apparatus 100. The report image data 215 in the report image data storage module 125 may have been read by the report image reading device 110.

The definition information storage server 130 is connected to the image processing apparatus 100 via the communication line 199B. The definition information storage server 130 includes a report definition information setting file storage module 135, and transfers a report definition information setting file 205 (see FIG. 2) in the report definition information setting file storage module 135 to the image processing apparatus 100.

The display 140 is connected to the image processing apparatus 100. The display 140 receives a character recognition result from the image processing apparatus 100, and outputs the character recognition result to a display such as a liquid crystal display.

Background art of the image processing apparatus 100 according to the present exemplary embodiment will be described.

There is a technology of recognizing a character described in a frame. For example, the technology recognizes a report 300 as illustrated in FIG. 3. In the present report 300, a manufacturing date frame 310 for describing a manufacturing date and a product number frame 320 for describing a product number are set. A person who describes information on the record 300 enters the manufacturing date of, for example, a given part in the manufacturing date frame 310 and the product number of the part in the product number frame 320. As a result, only the manufacturing date is described in the manufacturing date frame 310, and only the product number is described in the product number frame 320.

If a frame for describing a character string is set, and if character strings or words to be described in the frame are limited, as described above, it is possible to make the recognition rate higher than in a case in which it is allowed to freely describe a character string or word.

As to the manufacturing date, for example, the manufacturing date frame 310 may be specified as a space in the record 300 for describing the date of manufacturing, as illustrated in FIG. 3. In this case, the manufacturing date to be entered in the specified manufacturing date frame 310 is limited to numbers. If the characters are thus limited in the recognition process, therefore, the accuracy is improved. For example, it is now assumed that the position of the manufacturing date frame 310 in the report 300 and the date to be described in the manufacturing date frame 310 are limited to the following format:

{positional information of manufacturing date frame} {applicable frame format information YYYYMMDD}

Herein, the positional information of the manufacturing date frame 310 is expressed by, for example, the X and Y coordinates of the upper-left corner and the lower-right corner of the manufacturing date frame 310. Further, the format information indicates limitation to a format in which YYYY, MM, and DD are a four-digit number representing a year, a two-digit number representing a month, and a two-digit number representing a day, respectively.

Regular expressions are an example of a method of specifying such limitation of character string patterns. There are various notations of regular expressions. FIG. 4 illustrates a notation of regular expressions as an example. For example, there are regular expression rules as described below.

A regular expression rule "[ . . . ]" means "a character corresponding to one of . . . , which may be specified as a range, such as [A-Z]."

A regular expression rule "[^ . . . ]" means "a character corresponding to none of . . . , which may be specified as a range."

A regular expression rule "*" means "0 or more repetitions of the immediately preceding pattern."

A regular expression rule "+" means "1 or more repetitions of the immediately preceding pattern."

A regular expression rule "{m}" means "m number of repetitions of the immediately preceding pattern."

A regular expression rule "{m,}" means "more than m number of repetitions of the immediately preceding pattern."

A regular expression rule "{m,n]}" means "more than m and less than n number of repetitions of the immediately preceding pattern."

A regular expression rule "." means "an arbitrary character."

A regular expression rule "|" means "logical sum of the preceding and following regular expressions."

For example, if the target is limited to eight-digit numbers, as described above, a regular expression [0-9]{8} may be described. With the format information of the target frame (regular expressions in the above example) thus set for the characters described in the frame, it is possible to enhance the accuracy of recognizing the characters described in the frame. To improve the recognition accuracy in the recognition of a report, however, it is necessary to set recognition target frame information related to the above-described recognition target characters and report definition information such as the format information.

FIG. 2 is a conceptual module configuration diagram of a configuration example of the image processing apparatus 100 according to the present exemplary embodiment. The image processing apparatus 100 includes a definition information interpretation module 210, a recognition target setting module 220, a recognition candidate generation module 230, and a definition information-attached recognition execution module 240. The report definition information setting file 205 is extracted from the report definition information setting file storage module 135 in the definition information storage server 130. The report image data 215 is extracted from the report image data storage module 125 in the image data storage server 120 or received from the report image reading device 110.

The definition information interpretation module 210, which is connected to the recognition target setting module 220 and the definition information-attached recognition execution module 240, receives the report definition information setting file 205. The definition information interpretation module 210 receives the report definition information setting file 205 describing the positional information of a frame in a report as the recognition target (hereinafter also referred to as recognition target frame information), recognition format information, and so forth, and interprets the definition information for report recognition described in the report definition information setting file 205. In addition to the recognition target frame information, the report definition information setting file 205 may include, as the recognition format information, one or a combination of a set of character strings that may be in a first frame and a second frame, regular expression information representing the relationship between the character string in the first frame and the character string in the second frame, and the limitation of types of the character string in the first frame and the character string in the second frame.

The recognition target setting module 220, which is connected to the definition information interpretation module 210 and the recognition candidate generation module 230, receives the report image data 215 and transfers recognition target area data 225 to the recognition candidate generation module 230. The recognition target setting module 220 receives the report image data 215, which is an example of the image of a document, and sets a recognition target area in the report image data 215 as the recognition target area data 225 on the basis of the recognition target frame information in the definition information interpreted by the definition information interpretation module 210.

The recognition candidate generation module 230, which is connected to the recognition target setting module 220 and the definition information-attached recognition execution module 240, transfers recognition candidate data 235 to the definition information-attached recognition execution module 240. The recognition candidate generation module 230 recognizes the character string in the recognition target area based on the recognition target area data 225 set by the recognition target setting module 220, and generates the recognition candidate data 235, which is a collection of plural character recognition candidates. The recognition candidate generation module 230 may employ any character recognition technology capable of outputting plural character recognition candidates, such as a character recognition technology that has learned from actual handwritten characters, for example.

The definition information-attached recognition execution module 240, which is connected to the definition information interpretation module 210 and the recognition candidate generation module 230, outputs a recognition result 245 and reject information 247. On the basis of the definition information in the report definition information setting file 205 defining the relationship between the character string in the first frame and the character string in the second frame different from the first frame, the definition information-attached recognition execution module 240 selects a character recognition result in the first frame from plural character recognition candidates in the first frame.

The definition information-attached recognition execution module 240 may identify the second frame related to the first frame on the basis of the positional information of the frames in the report definition information setting file 205, and select the character recognition result in the first frame in accordance with the relationship between the plural character recognition candidates in the first frame and plural character recognition candidates in the second frame.

Further, the definition information-attached recognition execution module 240 may select a character recognition result matching the report definition information setting file 205 from the plural character recognition candidates in the first frame and the plural character recognition candidates in the second frame.

For example, the definition information-attached recognition execution module 240 may determine whether or not a recognition candidate matching the recognition format information interpreted by the definition information interpretation module 210 is present in the plural recognition candidate character strings (the recognition candidate data 235) obtained through the recognition of the character string in the recognition target area based on the recognition target frame information, and output information as to whether or not the recognition candidate has matched the final recognition result 245 and the recognition format (this information will hereinafter be referred to as the reject information 247). The definition information-attached recognition execution module 240 outputs the recognition result 245 in a predetermined format (for each recognition target frame, for example).

FIG. 5 is a flowchart illustrating an example of processing according to the present exemplary embodiment.

At step S502 in FIG. 5, the definition information interpretation module 210 receives the report definition information setting file 205 describing the recognition target frame information, the recognition format information, and so forth of the report image data 215 as the recognition target.

At step S504, the definition information interpretation module 210 interprets the definition information described in the report definition information setting file 205. The definition information interpreted by the definition information interpretation module 210 includes the recognition target frame information and the frame type, the recognition format, and the limitation or non-limitation of recognizable character types set for each recognition target frame.

At step S506, the recognition target setting module 220 sets the recognition target area in the report image data 215 on the basis of the result of interpretation of the recognition target frame information included in the definition information described in the report definition information setting file 205 and interpreted by the definition information interpretation module 210.

At step S508, the recognition candidate generation module 230 recognizes the character string in the recognition target area set by the recognition target setting module 220 on the basis of the recognition target frame information interpreted by the definition information interpretation module 210, and generates the recognition candidate data 235, which is a collection of plural recognition candidates. The recognition candidate data 235 herein refers to recognition candidate "path" data formed of all segmentation patterns of the character string in the recognition target area and recognition results of the patterns.

At step S510, the definition information-attached recognition execution module 240 determines whether or not any candidate in the recognition candidate data 235 for the character string in the recognition target area set by the recognition target setting module 220 matches the recognition format information in the definition information interpreted by the definition information interpretation module 210.

At step S512, if the determination result at step S510 as to whether or not any candidate in the recognition candidate data 235 matches the recognition format information indicates that the recognition result 245 matching the recognition format is present in the recognition candidate data 235, the definition information-attached recognition execution module 240 outputs the reject information 247 notifying the match with the recognition result 245. If the recognition result 245 matching the recognition format information is absent in the recognition candidate data 235, the definition information-attached recognition execution module 240 outputs the reject information 247 indicating mismatch between the recognition result 245 and a false recognition result determined to be closest to the correct recognition result among the candidates in the recognition candidate data 235. If the recognition result 245 matching the recognition format information is absent in the recognition candidate data 235, as described above, the definition information-attached recognition execution module 240 may only output the reject information 247, without outputting the recognition result 245 (the result of false recognition in this case). Further, the definition information-attached recognition execution module 240 may output the recognition result 245 in a predetermined format, such as formatted output for each recognition target area.

At step S514, the definition information-attached recognition execution module 240 determines whether or not all report definition information to be processed interpreted by the definition information interpretation module 210 has been processed. If all report definition information has not been processed, the processing returns to step S504 to repeat a series of processes from step S504 to step S512 including the interpretation of the definition information, the setting of the recognition area, the generation of the recognition candidate data 235, the execution of the recognition with the definition information, and the output of the recognition result 245 and the reject information 247. If all definition information to be processed has been processed, the present processing of recognizing report data is completed (step S599).

FIG. 6 illustrates a specific example of the report definition information setting file 205 used in the present exemplary embodiment. In respective rows in the report definition information setting file 205 exemplified in FIG. 6, definition information items for respective recognition target frames in the report image data 215 are described.

Further, the definition information items set for the respective recognition target frames are listed in respective columns, delimited by comma as illustrated in FIG. 6, for example. The delimitation is, of course, not limited to comma, and may be performed by another delimiting identifier (such as tab or space). Further, the definition information items listed here include, for example, respective frame names of the recognition target frames, each of which may be determined arbitrarily (uniquely, however, in the same report image data 215), the recognition format information of the character strings in the recognition target frames, and accompanying information necessary for the recognition based on the recognition format information.

The information in the columns of the definition information items set for the respective recognition target frames will now be described in detail.

FIG. 7 is a diagram illustrating a specific example of information described in columns 1 and 2 of the report definition information setting file 205.

As illustrated in the example of FIG. 7, the frame name of the recognition target frame is described in column 1 of the report definition information setting file 205. Herein, it is possible to set the frame name arbitrarily, but uniquely, for the report image data 215 to be processed. For example, a frame name Field001 is set in FIG. 7. The image processing apparatus 100 outputs the recognition result 245 in a predetermined format for each frame name set herein, for example.

Further, command information representing the recognition format for the recognition target frame is described in column 2 of the report definition information setting file 205. FIG. 8 illustrates a specific example of the command information described in column 2 of the report definition information setting file 205.

Specifically, the commands illustrated in the example of FIG. 8 include frame type specification commands for the recognition target frame (such as commands "C," "HL," and "VL") and recognition format definition commands for the recognition target frame (such as commands "WL," "WF," "RS," and "RF"). Specific meanings of these commands will be described below.

The command "C" is a frame type specification command indicating that the recognition target frame is a single character frame, and has accompanying information described in columns 3 to 7 of the report definition information setting file 205 following the present command. The command is formally named as "Char."

The command "HL" is a frame type specification command indicating that the recognition target frame is a horizontal character string frame, and has accompanying information described in columns 3 to 7 of the report definition information setting file 205 following the present command. The command is formally named as "Horizontal Line."

The command "VL" is a frame type specification command indicating that the recognition target frame is a vertical character string frame, and has accompanying information described in columns 3 to 7 of the report definition information setting file 205 following the present command. The command is formally named as "Vertical Line."

FIG. 9 illustrates a specific example of the accompanying information in columns 3 to 7 corresponding to the commands "C," "HL," and "VL." In the accompanying information in columns 3 to 7 corresponding to the commands "C," "HL," and "VL," the accompanying information in columns 3 to 6 are frame position information of a character string frame 1000 as illustrated in the example of FIG. 10. That is, with the origin (0, 0) set at the upper-left point of the image, the y coordinate value of the upper-left pixel of the character string frame 1000 (top), the y coordinate value of the lower-left pixel of the character string frame 1000 (bottom), the x coordinate value of the upper-left pixel of the character string frame 1000 (left), and the x coordinate value of the upper-right pixel of the character string frame 1000 (right) are described in column 3, column 4, column 5, and column 6, respectively, as illustrated in the example of FIGS. 9 and 10.

Then, a character type limitation pattern value is described in column 7 as a part of the accompanying information in columns 3 to 7 corresponding to the commands "C," "HL," and "VL," as illustrated in the example of FIG. 9. FIG. 11 illustrates a specific example of character type limitation patterns describable in column 7. If it is desired to limit the types of recognizable characters in the recognition target frame to numbers, upper-case Roman characters, and lower-case Roman characters, for example, the logical sum of respective corresponding values ("0x0001" for numbers, "0x0002" for upper-case Roman characters, and "0x0004" for lower-case Roman characters) is calculated and described as "0x0007" in column 7. The bit of each digit is assigned with a range of character type limitation. Herein, "0x" is a notation representing a hexadecimal number.

The command "WL" is a recognition format definition command indicating specification of a recognition candidate list for the character string in the recognition target frame, and has the recognition candidate list (accompanying information) described in columns 3 to 7 of the report definition information setting file 205 following the present command. The command is formally named as "Word List." If the types of the character string to be recognized in the recognition target frame are previously limited, the corresponding recognition candidate character strings are listed in columns 3 to N.

The command "WF" is a recognition format definition command indicating specification of a recognition candidate list file for the character string in the recognition target frame, and a recognition candidate list file (accompanying information) name to be referred to is described in column 3 of the report definition information setting file 205 following the present command. The command is formally named as "Word File."

FIG. 12 illustrates a specific example of a recognition candidate list file 1200. If the types of the character string to be recognized in the recognition target frame are previously limited, and if the number of recognition candidate character strings is large, the recognition candidate list file 1200 as illustrated in the example of FIG. 12 may be used other than direct specification of the recognition candidate character strings by the above-described command "WL." The present file is a text file listing recognition candidate character strings. The name of the text file is described in column 3 of the report definition information setting file 205 following the command "WF."

The command "RS" is a recognition format definition command indicating application of regular expressions to the character string in the recognition target frame, and regular expression patterns (accompanying information) to be applied are described in columns 3 to N of the report definition information setting file 205 following the present command in the notation as illustrated in FIG. 4, for example. The command is formally named as "Regex String."

The command "RF" is a recognition format definition command indicating specification of a regular expression pattern file for the character string in the recognition target frame, and a regular expression pattern file (accompanying information) name to be referred to is described in column 3 of the report definition information setting file 205 following the present command. The command is formally named as "Regex File."

Figure 13:
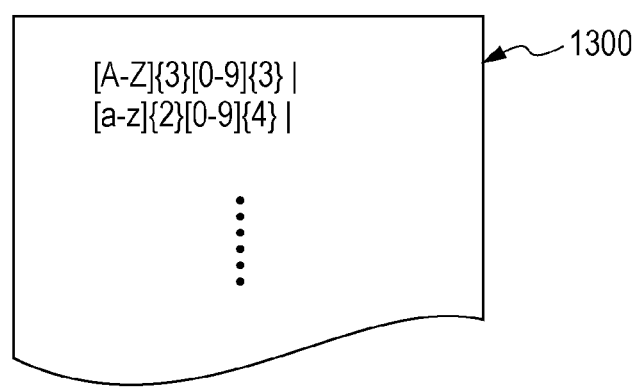
FIG. 13 is an explanatory diagram illustrating an example of a regular expression pattern file used in the present exemplary embodiment.

FIG. 13 illustrates a specific example of a regular expression pattern file 1300. If it is desired to specify plural regular expression patterns for the recognition in the recognition target frame, for example, the file name of the regular expression pattern file 1300 as illustrated in FIG. 13 may be described in column 3 of the report definition information setting file 205 following the command "RF," other than direct specification of the regular expression patterns by the command "RS," to allow the specification of the plural regular expression patterns. FIG. 13 illustrates an example of the regular expression pattern file 1300 for applying two types of regular expression pattern [A-Z]{3}[0-9]{3} and [a-z]{2}[0-9]{4}.

A specific example of the setting of the report definition information will now be described.

Figure 14A:
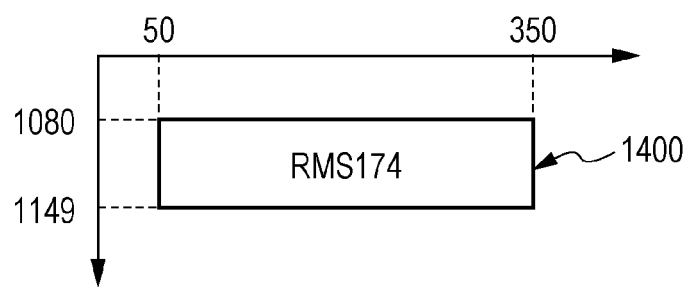
FIGS. 14A and 14B are explanatory diagrams illustrating an example of a report definition information setting file used in the present exemplary embodiment.
Figure 14B:
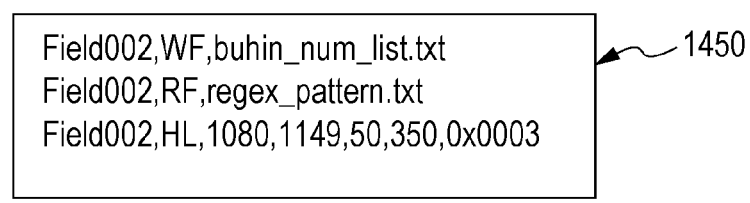

FIGS. 14A and 14B illustrate a specific example of the setting of the report definition information. An example of a report definition information setting file 1450 illustrated in FIG. 14B illustrates a setting example in which the following definition information is set for a recognition target frame 1400 illustrated in FIG. 14A.

Name of recognition target frame: Field002

Horizontal line frame

Positional information of recognition target frame: (top, bottom, left, right)=(1080, 1149, 50, 350)

Specification of recognition candidate list file: Recognition candidate list file name buhin_num_list.txt Specification of regular expression file: Regular expression pattern file name regex_pattern.txt Limitation to numbers and upper-case Roman characters: Character type limitation pattern 0x0003

Herein, the recognition candidate list file buhin_num_list.txt and the regular expression pattern file regex_pattern.txt represent the text files illustrated in the foregoing examples of FIGS. 12 and 13 (the recognition candidate list file 1200 and the regular expression pattern file 1300), which list the recognition candidates of the character string in the present recognition target frame and the regular expression patterns to be applied, respectively.

With the report definition information setting method as in the example illustrated in FIG. 14B, it is thus possible to set plural definition information items (specification of recognition candidates, specification of regular expression patterns, and specification of limitation of character types) for a single recognition target frame as in the example illustrated in FIG. 14A. As these plural definition information items are set, the accuracy of recognizing the character string in the recognition target frame is improved.

Figures 15A, 15B:
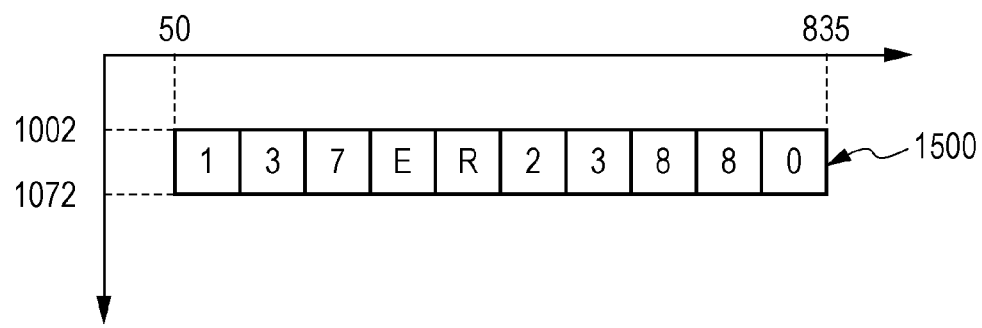
FIGS. 15A and 15B are explanatory diagrams illustrating an example of the report definition information setting file used in the present exemplary embodiment.

FIGS. 15A and 15B illustrate another specific example of the setting of the report definition information. An example of a report definition information setting file 1550 illustrated in FIG. 15B illustrates a setting example in which the following definition information is set for a recognition target frame 1500 illustrated in the example of FIG. 15A.

Name of recognition target frame: Field003

Horizontal line frame

Positional information of recognition target frame: (top, bottom, left, right)=(1002, 1072, 50, 835)

Positional information of single character recognition frames and specification of limitation of character types:

(top, bottom, left, right, limit_pattern)=(1002, 1072, 50, 128, 0x0001)

(top, bottom, left, right, limit_pattern)=(1002, 1072, 128, 205, 0x0001)

(top, bottom, left, right, limit_pattern)=(1002, 1072, 205, 283, 0x0001)

(top, bottom, left, right, limit_pattern)=(1002, 1072, 283, 362, 0x0002)

(top, bottom, left, right, limit_pattern)=(1002, 1072, 362, 442, 0x0002)

(top, bottom, left, right, limit_pattern)=(1002, 1072, 442, 522, 0x0001)

(top, bottom, left, right, limit_pattern)=(1002, 1072, 522, 600, 0x0001)

(top, bottom, left, right, limit_pattern)=(1002, 1072, 600, 678, 0x0001)

(top, bottom, left, right, limit_pattern)=(1002, 1072, 678, 758, 0x0001)

(top, bottom, left, right, limit_pattern)=(1002, 1072, 758, 835, 0x0001)

Specification of recognition candidate list file: Recognition candidate list file name product_num_list.txt In the example illustrated in FIGS. 15A and 15B, even in the case of the recognition target frame 1500 formed of plural single character recognition target frames as illustrated in FIG. 15A, it is thus possible to specify the recognition candidates (specify the recognition candidate list file by the command "WF") for the entire recognition target frame formed of the plural single character frames by using the report definition information setting method. Accordingly, the recognition accuracy in the recognition target frame is improved. That is, the method specifies the set of character strings described in the recognition candidate list file product_num_list.txt corresponding to the character string in the entire recognition target frame 1500, and the limitation of the character string (one character in this case) in each of the single character recognition target frames (there are ten single character recognition target frames in the recognition target frame 1500) as a part of the recognition target frame 1500 (for example, the character in the leftmost single character frame is a number). This example is an example of the definition information defining the relationship between the character string in the first frame and the character string in the second frame different from the first frame.

If any of the character strings described in the recognition candidate list file product_num_list.txt contradicts the definition of the character string in the corresponding single character recognition target frame, a character string described in the recognition candidate list file product_num_list.txt and matching the definition of the character string in the single character recognition target frame is used. As an example of the contradiction, the leftmost character of the character string described in the recognition candidate list file product_num_list.txt may not be a number. In this case, the character string is excluded, and another character string described in the recognition candidate list file product_num_list.txt is used. That is, if one of the definition information of the first frame and the definition information of the second frame is definition information A listing plural character recognition candidates, and if the definition information A includes a character recognition candidate contradicting definition information B corresponding to the other one of the definition information of the first frame and the definition information of the second frame, a character recognition candidate in the definition information A matching the definition information B is adopted.

Figure 16A:
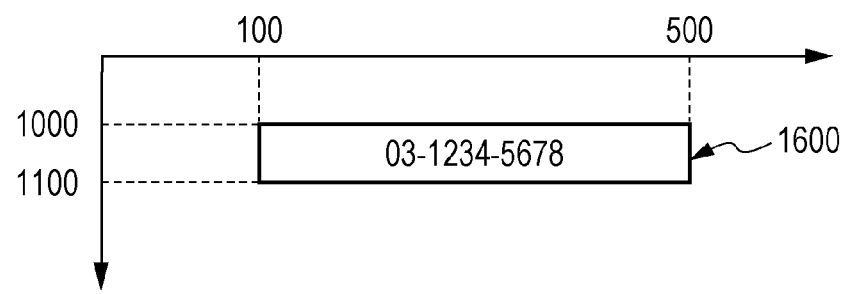
FIGS. 16A to 16C are explanatory diagrams illustrating an example of the processing according to the present exemplary embodiment.
Figure 16B:
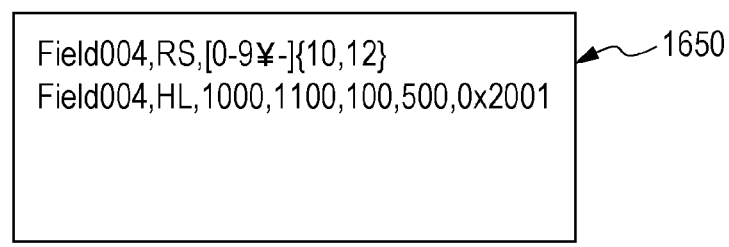
Figure 16C:
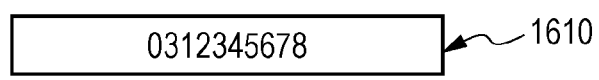

FIGS. 16A to 16C illustrate still another specific example of the setting of the report definition information. An example of a report definition information setting file 1650 illustrated in FIG. 16B illustrates a setting example in which the following definition information is set for a recognition target frame 1600 illustrated in the example of FIG. 16A.

Name of recognition target frame: Field004

Horizontal line frame

Positional information of recognition target frame: (top, bottom, left, right)=(1000, 1100, 100, 500)

Specification of regular expression pattern: Regular expression pattern [0-9¥-]{10, 12}

In the specific example illustrated in FIGS. 16A to 16C, the report definition information is set for a telephone number entry field, and the regular expression pattern and the character type limitation pattern are associated with the recognition target frame, as illustrated in the example of FIG. 16B.

Herein, the regular expression pattern "[0-9¥-]{10, 12}" illustrated in the example of FIG. 16B indicates that the recognition target in the recognition target frame is "limited to characters 0 to 9 and hyphen "-," with the number of characters limited to 10 to 12." It is therefore indicated that, in the recognition target frame thus set with the report definition information (the recognition target frame 1600 and the report definition information setting file 1650), a description "03-1234-5678" as illustrated in the example of FIG. 16A and a description "0312345678" as illustrated in the example of FIG. 16C are both correct recognition results.

Further, in the case as illustrated in the example of FIG. 3, if the manufacturing date in the manufacturing date frame 310 is included in the product number in the product number frame 320 as a portion of the product number, the definition information of the product number frame 320 is defined to refer to the definition information of the manufacturing date frame 310. That is, the definition information defining the relationship between the character string in the first frame and the character string in the second frame may define the definition information of one of the first and second frames as including the definition information of the other one of the first and second frames (all or a part of the definition information of the other one of the first and second frames). When selecting the character recognition result in the product number frame 320, therefore, the definition information-attached recognition execution module 240 selects, as the character recognition result, a character recognition candidate including the character recognition result in the manufacturing date frame 310 from plural character recognition candidates for the product number frame 320 recognized by the recognition candidate generation module 230, in accordance with the definition information associated with the product number frame 320.

Further, if the definition information A of one of the first and second frames includes plural definition information items (definition information A1 and definition information A2, for example), and if the definition information A1 includes the character recognition result of the other one of the first and second frames and the definition information A2 includes the definition information for the character recognition result of the other one of the first and second frames, contradiction with the definition information A2 may arise after the character recognition result of the other one of the first and second frames is determined. If such contraction arises, a character recognition result may be reselected from plural character recognition candidates for the other one of the first and second frames. Specifically, in the foregoing example of FIG. 3, if the character recognition result of the manufacturing date frame 310 (the manufacturing date) is included in the definition information A1 of the product number frame 320 and a list of character strings corresponding to the manufacturing date is defined in the definition information A2 of the product number frame 320, contradiction arises after the determination of the character recognition result of the manufacturing date frame 310 if the character recognition result is not included in the list of the definition information A2. In the event of such contradiction, a character recognition candidate in the plural character recognition candidates for the manufacturing date frame 310 matching the definition information A2 is selected as the character recognition result of the manufacturing date frame 310.

Figure 17:
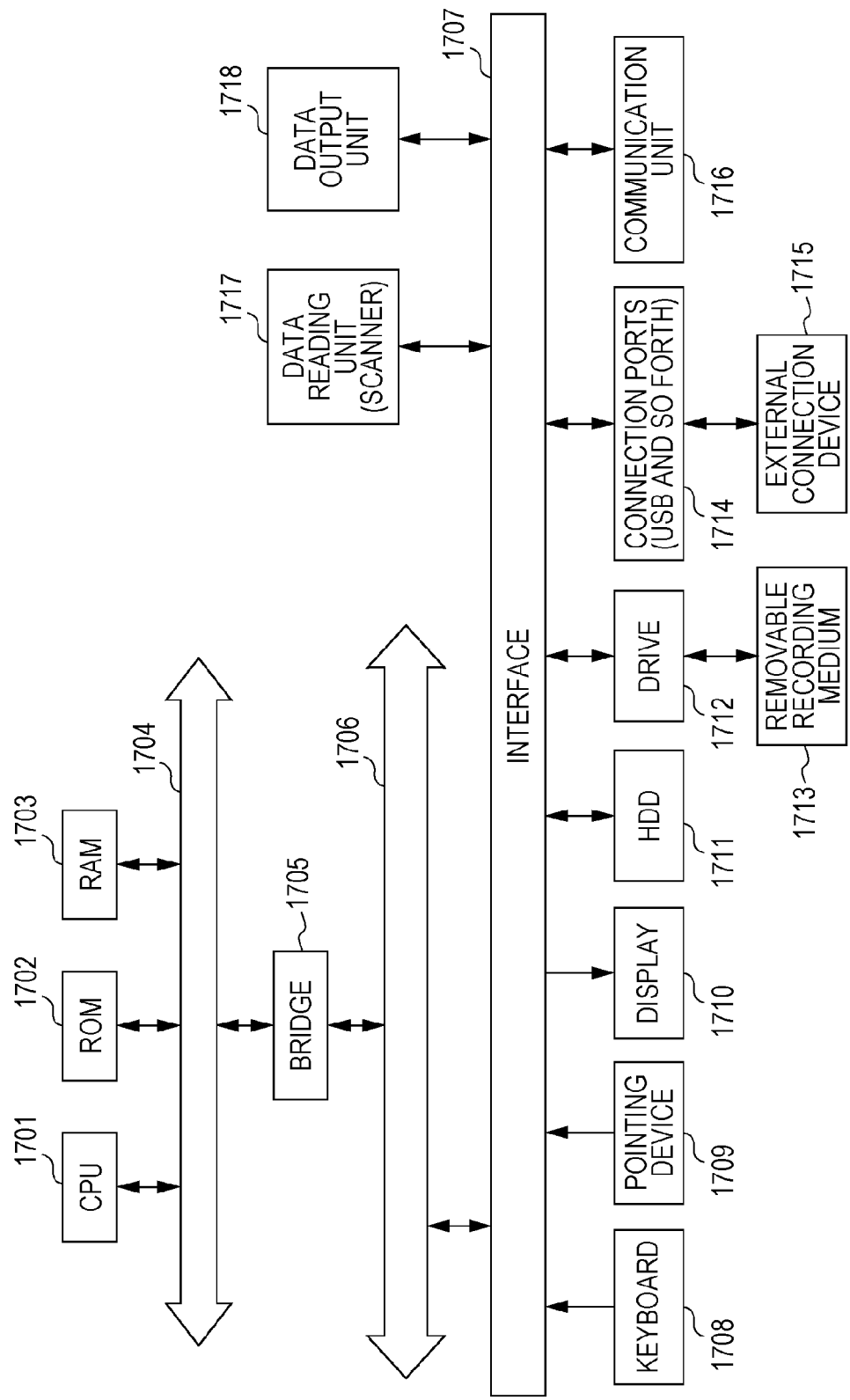
FIG. 17 is a block diagram illustrating a hardware configuration example of a computer that realizes the present exemplary embodiment.

A hardware configuration example of the image processing apparatus 100 according to the present exemplary embodiment will be described with reference to FIG. 17. The configuration illustrated in FIG. 17 is a hardware configuration example configured by a personal computer (PC), for example, and including a data reading unit 1717 such as a scanner and a data output unit 1718 such as a printer.

A central processing unit (CPU) 1701 is a controller that executes processing according to a computer program describing an execution sequence of the various modules described in the foregoing exemplary embodiment, i.e., modules such as the definition information interpretation module 210, the recognition target setting module 220, the recognition candidate generation module 230, and the definition information-attached recognition execution module 240.

A read only memory (ROM) 1702 stores programs, arithmetic parameters, and so forth used by the CPU 1701. A random access memory (RAM) 1703 stores programs used in the execution of the CPU 1701, parameters changed as appropriate during the execution, and so forth. The CPU 1701, the ROM 1702, and the RAM 1703 are connected to one another by a host bus 1704 formed of a CPU bus or the like.

The host bus 1704 is connected to an external bus 1706, such as a peripheral component interconnect/interface (PCI) bus, via a bridge 1705.

A keyboard 1708 and a pointing device 1709 such as a mouse are input devices operated by an operator. A display 1710, such as a liquid crystal display or a cathode ray tube (CRT), displays various information as text or image information.

A hard disk drive (HDD) 1711 includes and drives a hard disk, and records and regenerates information and programs executed by the CPU 1701. The hard disk stores the report definition information setting file 205, the report image data 215, the recognition target area data 225, the recognition candidate data 235, the recognition result 245, the reject information 247, and so forth. The hard disk further stores various computer programs such as various other data processing programs.

A drive 1712 reads data or a program recorded in a removable recording medium 1713 installed therein, such as a magnetic disk, an optical disk, a magneto-optical disk, or a semiconductor memory, and supplies the data or program to the RAM 1703 connected to the drive 1712 via an interface 1707, the external bus 1706, the bridge 1705, and the host bus 1704. The removable recording medium 1713 is also usable as a data recording area similarly to the hard disk.

Connection ports 1714, which are ports for connection with an external connection device 1715, includes connection units conforming to universal serial bus (USB), Institute of Electrical and Electronics Engineers (IEEE) 1394, and so forth. The connection ports 1714 are connected to the CPU 1701 and so forth via the interface 1707, the external bus 1706, the bridge 1705, the host bus 1704, and so forth. A communication unit 1716 is connected to a communication line, and executes data communication processing with an external device or the like. The data reading unit 1717, such as a scanner, for example, executes a process of reading a document. The data output unit 1718, such as a printer, for example, executes a process of outputting document data.

The hardware configuration of the image processing apparatus 100 illustrated in FIG. 17 illustrates a configuration example. The present exemplary embodiment is not limited to the configuration illustrated in FIG. 17, and may have any configuration capable of executing the modules described in the present exemplary embodiment. For example, a part of the modules may be configured by special hardware (such as an application specific integrated circuit (ASIC), for example). Further, a part of the modules may be located in an external system and connected to the image processing apparatus 100 by a communication line. Furthermore, the system illustrated in FIG. 17 may be prepared in plurality, and the systems may be connected by a communication line to cooperate with one another. Further, the modules may be incorporated in, for example, a copier, a facsimile machine, a scanner, a printer, or a multifunction machine (an image processing apparatus having the functions of two or more of a scanner, a printer, a copier, a facsimile machine, and so forth).

Each of the above-described programs may be provided as stored in a recording medium, or may be provided by a communication unit. In that case, the above-described program may be considered as an invention of "a computer readable recording medium recorded with a program."

"A computer readable recording medium recorded with a program" refers to a recording medium readable by a computer and recorded with a program to be used for, for example, installation, execution, and distribution of the program.

The recording medium may be, for example, a digital versatile disk (DVD), which includes standards such as "DVD-recordable (R), DVD-rewritable (RW), and DVD-random access memory (RAM)" specified by DVD Forum and "DVD+R and DVD+RW" specified by DVD+R Alliance, a compact disc (CD), such as a CD-read only memory (ROM), a CD-R, or a CD-RW, a Blu-ray (registered trademark) disc, a magneto-optical disk (MO), a flexible disk (FD), a magnetic tape, a hard disk, a ROM, an electrically erasable programmable ROM (EEPROM) (registered trademark), a flash memory, a RAM, or a secure digital (SD) memory card.

Further, the foregoing program or a part thereof may be recorded in the foregoing recording medium to be stored or distributed, for example. The program or a part thereof may also be transmitted by communication with the use of a transmission medium, such as a wired network, a radio communication network, or a combination thereof used in a local area network (LAN), a metropolitan area network (MAN), a wide area network (WAN), the Internet, an intranet, an extranet, or the like, for example, or may be transmitted by carrier waves.

Further, the foregoing program may be a part of another program, or may be recorded in a recording medium together with a different program. Furthermore, the program may be divided and recorded in plural recording media. Further, the program may be recorded in any restorable form, such as a compressed or encrypted form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor configured to execute:
      a receiving unit configured to receive an image of a document;
      a recognition candidate generation unit configured to recognize a plurality of character recognition candidates in a first frame of the document;
      a determination unit configured to determine whether a first character recognition candidate, among the plurality of character recognition candidates, matches definition information defining a relationship between a character string in the first frame of the document and a character string in a second frame of the document, wherein the second frame is different from the first frame;
      a selecting unit configured to select the first character recognition candidate as a character recognition result for the first frame of the document; and
      an output unit configured to output the first character recognition candidate as the character recognition result for the first frame of the document.

2. The image processing apparatus according to claim 1, wherein the definition information includes positional information of the frames, and
   wherein the selecting unit is further configured to identify the second frame related to the first frame on a basis of the positional information of the frames in the definition information, and select the character recognition result in the first frame in accordance with a relationship between the plurality of character recognition candidates in the first frame and a plurality of character recognition candidates in the second frame.

3. The image processing apparatus according to claim 2, wherein the definition information includes one or a combination of a set of character strings that may be in the first frame and the second frame, regular expression information representing the relationship between the character string in the first frame and the character string in the second frame, and limitation of types of the character string in the first frame and the character string in the second frame, and
   wherein the selecting unit is further configured to select a character recognition result matching the definition information from the plurality of character recognition candidates in the first frame and the plurality of character recognition candidates in the second frame.

4. The image processing apparatus according to claim 1, wherein the definition information includes one or a combination of a set of character strings that may be in the first frame and the second frame, regular expression information representing the relationship between the character string in the first frame and the character string in the second frame, and limitation of types of the character string in the first frame and the character string in the second frame, and
   wherein the selecting unit is further configured to select a character recognition result matching the definition information from the plurality of character recognition candidates in the first frame and a plurality of character recognition candidates in the second frame.

5. The image processing apparatus of claim 1, wherein the definition information of the first frame includes at least a part of the definition information of the second frame.

6. A non-transitory computer readable medium storing a program causing a computer to execute image processing, the processing comprising:
   receiving an image of a document;
   recognizing a plurality of character recognition candidates in a first frame of the document;
   determining whether a first character recognition candidate, among the plurality of character recognition candidates, matches definition information defining a relationship between a character string in the first frame of the document and a character string in a second frame of the document, wherein the second frame is different from the first frame;
   selecting the first character recognition candidate as a character recognition result for the first frame of the document; and
   outputting the first character recognition candidate as the character recognition result for the first frame of the document.

7. The non-transitory computer readable medium of claim 6, wherein the definition information of the first frame includes at least a part of the definition information of the second frame.

8. An image processing method comprising:
   receiving an image of a document;
   recognizing a plurality of character recognition candidates in a first frame;
   determining whether a first character recognition candidate, among the plurality of character recognition candidates, matches definition information defining a relationship between a character string in the first frame of the document and a character string in a second frame of the document different from the first frame of the document;
   selecting the first character recognition candidate as a character recognition result for the first frame of the document; and
   outputting the first character recognition candidate as the character recognition result for the first frame of the document.

9. The image processing method of claim 8, wherein the definition information of the first frame includes at least a part of the definition information of the second frame.

\* \* \* \* \*